United States Patent
Hirosawa

(10) Patent No.: US 6,199,429 B1
(45) Date of Patent: Mar. 13, 2001

(54) VIBRATING GYROSCOPE WITH ELASTIC VIBRATION ISOLATOR

(75) Inventor: Nobuyuki Hirosawa, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/241,602

(22) Filed: Feb. 1, 1999

(30) Foreign Application Priority Data

Feb. 3, 1998 (JP) .................................................. 10-022028

(51) Int. Cl.⁷ ........................................................ G01P 9/04
(52) U.S. Cl. .......................................... 73/504.15; 73/493
(58) Field of Search ............................... 73/443, 504.15, 73/504.16, 504.12; 310/345, 370

(56) References Cited

U.S. PATENT DOCUMENTS 5,581,032 * 12/1996 Uemura et al. ......................... 73/493
5,861,705 * 1/1999 Wakatsuki et al. ............... 73/504.16

FOREIGN PATENT DOCUMENTS 9-203638    8/1997 (JP) .

* cited by examiner

Primary Examiner—John E. Chapman
(74) Attorney, Agent, or Firm—Brinks Hofer Gilson & Lione

(57) ABSTRACT

A vibrating gyroscope comprises a vibrator having a base part and provided with cantilever vibrating arms having vibrating free end parts, elastic vibration isolator having first and second elastic members pressed against the opposite surfaces of the base part of the vibrator, a vibrator holding case holding the elastic vibration isolator holding the vibrator by its base part, and a wiring board to which the vibrator holding case holding the elastic vibration isolator combined with the vibrator is attached. The base part of the vibrator is held firmly between the first and the second elastic members of the elastic vibration isolator, and the elastic vibration isolator thus holding the vibrator is compressed in the vibrator holding case.

8 Claims, 17 Drawing Sheets

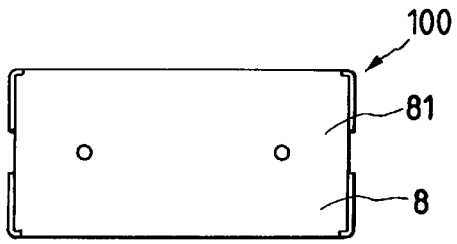
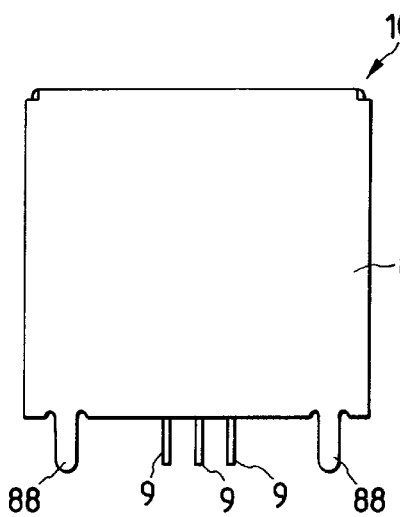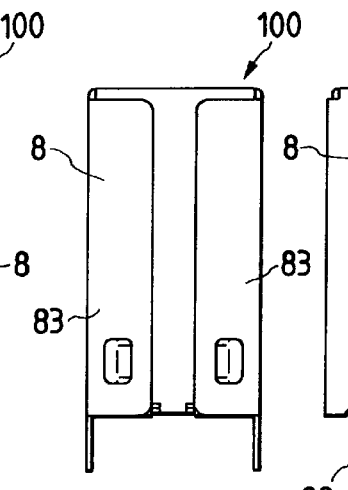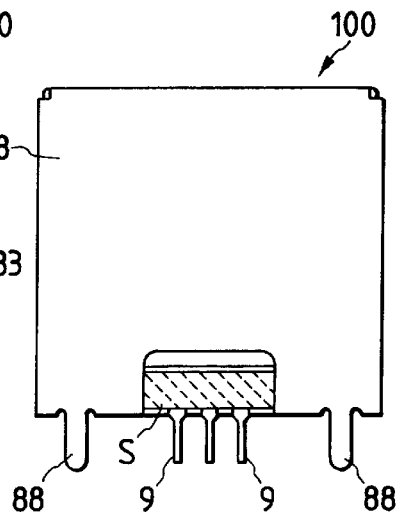
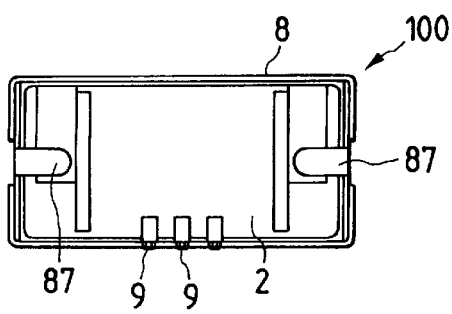

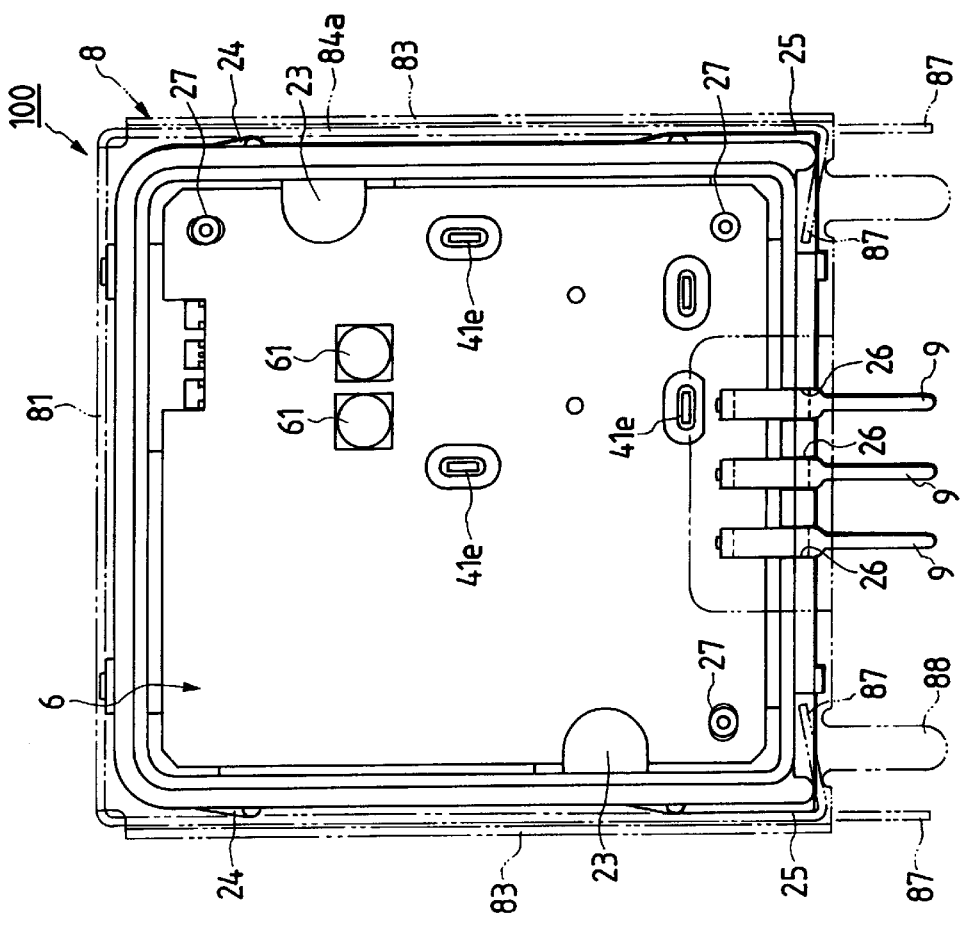
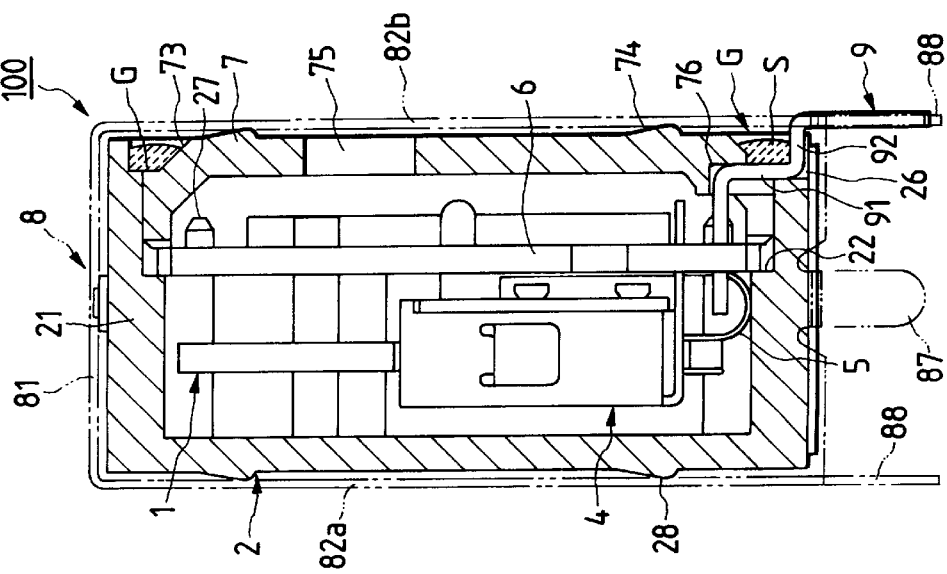

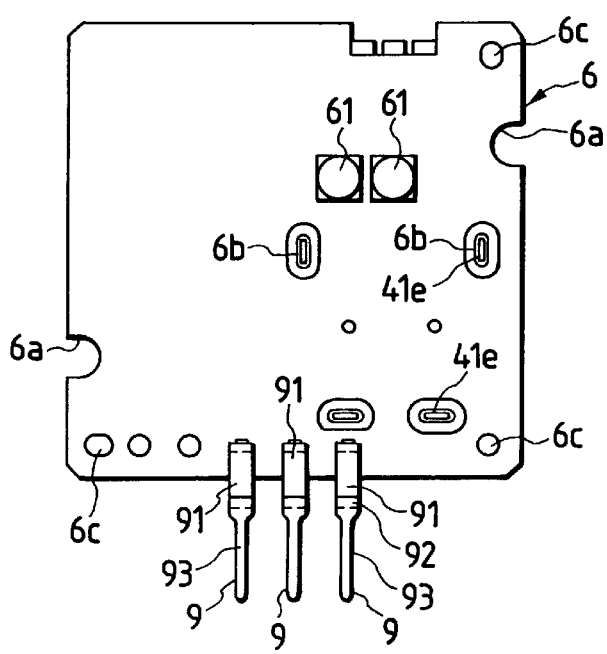
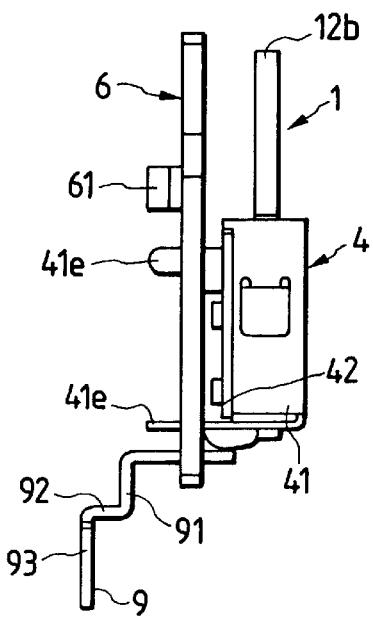
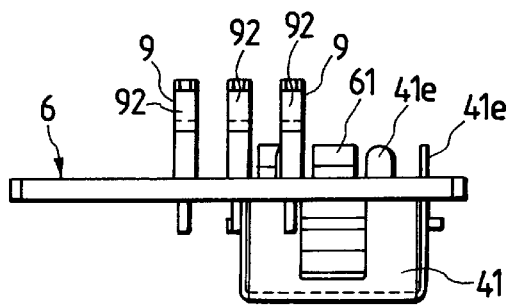
FIG. 4A
FIG. 4B
FIG. 4C

VIBRATING GYROSCOPE WITH ELASTIC VIBRATION ISOLATOR

BACKGROUND OF THE INVENTION

1. Field of the Invention

The present invention relates to a vibrating gyroscope to be incorporated into an angular speed sensing device included in a navigation system for an automobile.

2. Description of the Related Art

Referring to FIG. 22, a conventional vibrating gyroscope for measuring angular velocity has a case 221, pins 222, sensor support plate 223 provided with recesses 225, vibration isolators 224 each having a neck 226, provided with a through hole 227 and fitted in the recess 225 of the sensor support plate 223, a tuning fork unit 228 serving as a sensor, collars 229 each provided with a through hole 230, a wiring board 231 provided with through holes 232, a flexible flat cable 233, a lid 234, and terminals 235.

In this vibrating gyroscope, the sensor support plate 223 of a large mass supporting the sensor, i.e., the tuning fork unit 228, is supported on the four vibration isolators 224.

Since the sensor is attached to the sensor support plate 223 of a large mass, the sensor is unable to operate in a high response speed when the sensor support plate 223 is rotated at a high angular velocity. Consequently, the response of the sensor is delayed, and the operation of the sensor is unable to follow the change of the direction of angular velocity if the direction of angular velocity is reversed suddenly and, in some cases, the sensor is unable to provide an accurate output. The large sensor support plate 223 is heavy and the vibrating gyroscope has a complicated construction.

SUMMARY OF THE INVENTION

It is a first object of the present invention to provide a vibrating gyroscope having a simple construction, and employing a member of a small mass to be held by an elastic vibration isolator to reduce the effect of inertial force on a vibrator in order that the vibrator is able to respond at a high response speed to the quick change of angular velocity.

A second object of the present invention is to provide a vibrating gyroscope provided with a vibrator having a base part, and wiring lines connected to the base part of the vibrator by holding the base part of the vibrator between a plurality of elastic members. Since the wiring lines are connected to the base part of the vibrator by holding the base part of the vibrator between the plurality of elastic members, lead wires and such are not damaged when assembling the vibrating gyroscope.

A third object of the present invention is to provide a vibrating gyroscope having a first elastic member, a vibrator and a second elastic member placed in that order when assembling the vibrating gyroscope and capable of being easily assembled.

A fourth object of the present invention is to provide a vibrating gyroscope capable of suppressing the variation of the characteristic of a vibrator due to the inclination of the vibrator.

A fifth object of the present invention is to provide a vibrating gyroscope capable of easily assembled.

A sixth object of the present invention is to provide a vibrating gyroscope having elastic members capable of being uniformly distorted to reduce the variation of the characteristic of a vibrator.

A seventh object of the present invention is to provide a vibrating gyroscope employing elastic members capable of being easily held by lugs on a wiring board.

An eighth object of the present invention is to provide a vibrating gyroscope employing a vibrator holding case provided with retaining member for retaining an elastic member therein, and capable of preventing the elastic member from falling off the vibrator holding case even if an undesired force acts on the vibrator holding case.

A ninth object of the present invention is to provide a lightweight, inexpensive vibrating gyroscope employing an elastic vibration isolator made of silicone rubber.

According to a first aspect of the present invention, a vibrating gyroscope comprises a vibrator having a base part and provided with cantilever vibrating arms having vibrating free end parts, elastic vibration isolator put on the base part of the vibrator, and a wiring board supporting the elastic vibration isolator. Since the mass of the vibrator held by the elastic vibration isolator is small, the vibrator is scarcely subject to inertial force and is able to respond to the quick change of angular velocity at a high response speed, and the vibrating gyroscope is simple in construction.

Preferably, the vibrating gyroscope further comprises a vibrator holding case consisting of first and second holding members, the elastic vibration isolator has a plurality of vibration isolating members to be pressed against the opposite surfaces of the base part of the vibrator, respectively, to hold the base part of the vibrator therebetween, the elastic vibration isolator is interposed and compressed between the first and the second holding members, and the vibrator holding case is attached to the wiring board. Since the base part of the vibrator is held between the plurality of vibration isolating members, the joints of the electrodes formed on the base part of the vibrator, and lead wires and wiring lines of a flexible wiring board are not broken when assembling the vibrator and the elastic vibration isolator. If the elastic vibration isolator is provided with a hole and the base part of the vibrator is pressed in the hole to assemble the elastic vibration isolator and the vibrator, the joints of the electrodes, and the lead wires and the wiring lines may possibly caught by the elastic vibration isolator and broken.

Preferably, the elastic vibration isolator has a first elastic member having a hollow, and a second elastic member pressed against the base part of the vibrator fitted in the hollow of the first elastic member, and the base part of the vibrator is fitted in the hollow and is held between the first and the second elastic member. The vibrator and the elastic vibration isolator can easily be assembled simply by placing the base part of the vibrator in the hollow of the first elastic member, and putting the second elastic member on the base part of the vibrator.

Preferably, the base part of the vibrator has the shape of a plate, and the elastic members are pressed against the flat surfaces of the plate-shaped base part of the vibrator substantially perpendicularly to the surfaces of the base part by the vibrator holding case. Since the elastic members are pressed against the flat surfaces of the plate-shaped base part of the vibrator substantially perpendicularly to the surfaces of the base part, i.e., in directions along the thickness, by the vibrator holding case, the elastic members are hardly twisted and the vibrator is hardly tilted and hence the change of the sensing characteristic of the vibrator can be suppressed. If the elastic members are pressed in directions other than the directions along the thickness, the elastic members may be twisted and the vibrator may be tilted. Since the vibrator is tilted indefinitely if the elastic members are twisted, the sensing characteristic of the vibrator changes indefinitely.

Preferably, the vibrator holding case has a first holding member of a metal having at least a flat bottom wall and opposite side walls continuous with the flat bottom wall, and a plate-shaped second holding member, the first and the second holding member are pressed against the elastic members, respectively, at least one of the side walls of the first holding member is provided with a fastening lug, the elastic members and the base part of the vibrator are disposed between the side walls of the first holding member so that the surfaces of the base part and the flat surface of the bottom wall of the first holding member are substantially parallel to each other, and the fastening lug is fixed by crimping to the second holding member disposed with its plate-shaped part facing toward the flat bottom wall of the first holding member. Since the elastic members are compressed between the bottom wan of the first holding member and the second holding member, the elastic members can easily be pressed against the base part of the vibrator substantially perpendicularly to the surfaces of the base part of the vibrator, and hence the base part of the vibrator is hardly twisted and tilted. The vibrator, the elastic members and the vibrator holding case can easily be assembled by putting the first elastic member, the vibrator, the second elastic member and the second holding member in that order in the first holding member and crimping the fastening lug.

Preferably, the first holding member is provided with positioning parts for determining the distance between the flat bottom wall of the first holding ember and the plate-shaped part of the second holding member. The distance between the flat bottom wall of the first holding member and the plate-shaped part of the second holding member can accurately be determined by the positioning parts, the elastic members can accurately be compressed by a predetermined compressive strain, and the change of the characteristics of the vibrator can be suppressed.

Preferably, the side walls of the first holding member are provided with attaching lugs, respectively, and the vibrator holding case is attached to the wiring board by means of the attaching lugs. The vibrator holding case can easily be attached to the wiring board by fastening the attaching lugs to the wiring board.

Preferably, the vibrator holding case is provided with retaining parts for retaining the elastic members therein. The retaining parts positions and holds the elastic members in place in the vibrator holding case and prevents the elastic members from falling off the vibrator holding case even if undesirable force and vibrations are exerted on the vibrator holding case.

Preferably, the elastic members are made of silicone rubber. The elastic members made of silicone rubber are capable of exercising an excellent vibration isolating function at temperatures in a wide temperature range, and the vibrating gyroscope is lightweight and inexpensive.

BRIEF DESCRIPTION OF THE DRAWINGS

The above and other objects, features and advantages of the present invention will become more apparent from the following description taken in connection with the accompanying drawings, in which:

FIGS. 2A, 2B, 2C, 2D and 2E are a plan view, a front view, a bottom view, a right-hand side elevation and a rear elevation, respectively, of the vibrating gyroscope shown in FIG. 1;

FIGS. 3A and 3B are a longitudinal sectional view taken through a shield cover and a rear elevation without a lid, respectively, of the vibrating gyroscope shown in FIG. 1;

FIGS. 4A, 4B and 4C are a rear elevation, a left-hand side elevation and a bottom view, respectively, of the assembly of a vibrator and a wiring board included in the vibrating gyroscope shown in FIG. 1;

DESCRIPTION OF THE PREFERRED EMBODIMENTS

Figure 1:
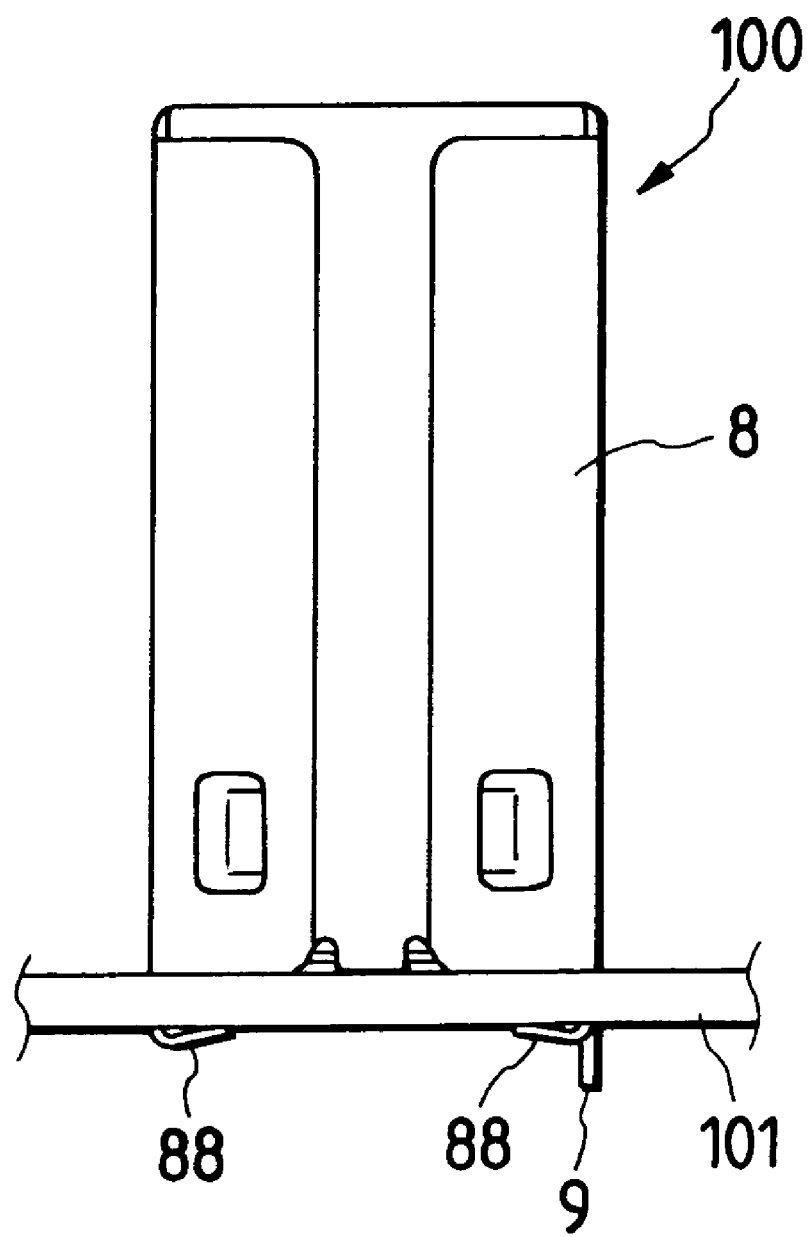
FIG. 1 is a side elevation of a vibrating gyroscope in a preferred embodiment according to the present invention.

As shown in FIG. 1, a vibrating gyroscope 100 internally provided with a three-armed tuning fork type vibrator 1 in a preferred embodiment according to the present invention is attached to a printed wiring board 101 included in a navigation system for a vehicle.

The three-armed tuning fork type vibrator 1 serves as a sensor included in a gyroscope for measuring angular velocity by generating vibrations by Coriolis force in a rotational system.

Figure 5:
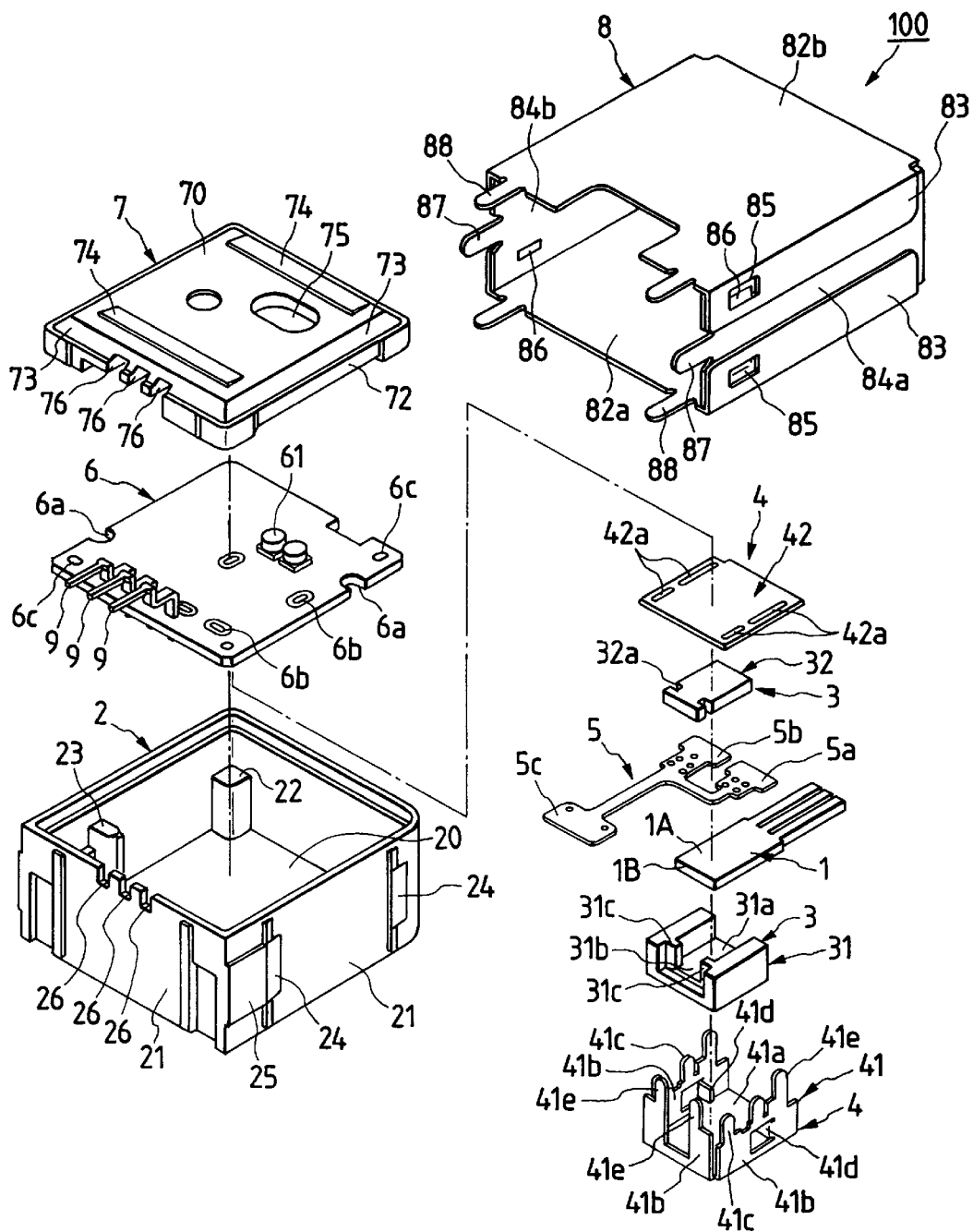
FIG. 5 is an exploded perspective view of the vibrating gyroscope shown in FIG. 1.

Referring to FIG. 5, the vibrating gyroscope 100 comprises a case 2 having an open end, the vibrator 1, a rubber vibration isolator 3 of rubber put on a base part 1A of the vibrator 1, a vibrator holding case 4 holding the rubber vibration isolator 3 put on the base part 1A of the vibrator 1, a flexible wiring board 5 connected to the base part 1A of the vibrator 1 by welding, a wiring board 6 attached to the vibrator holding case 4 holding the vibrator 1 is attached, a lid 7 for covering the open end of the case 2, and a shield cover 8 for shielding the assembly of the case 2 and the lid 7.

The vibrator 1 is a plate-shaped member formed by laminating a piezoelectric sheet serving as a driving means and a sensing means to a surface of a body of a constant-modulus material, such as elinvar, or a plate-shaped member formed entirely of a piezoelectric material. Driving electrodes for driving the vibrating arms of the vibrator 1 and detection electrodes for detecting the vibrations of the vibrating arms are attached to the piezoelectric surface of the vibrator 1.

Figure 20A:
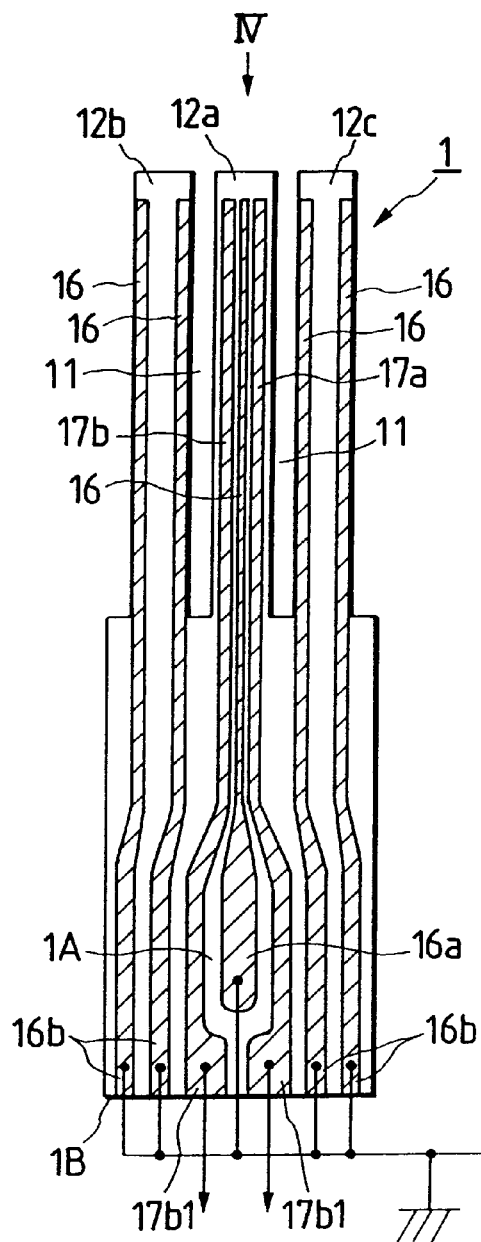
FIGS. 20A and 20B are a front elevation and a rear elevation, respectively, of a vibrator for explaining at the time of detecting driving of the vibrator.

In this embodiment, the vibrator 1 is a plate-shaped member of a piezoelectric ceramic material, such as PZT (a solid solution of $PbZrO_3$ and $PbTiO_3$). As shown in FIG. 20, the vibrator 1 has the base part 1A and three vibrating arms 12a, 12b and 12c separated by slits 11 and formed integrally with the base part 1A. Directions of dielectric polarization of the vibrating arms 12a, 12b and 12c are indicated by the arrows in FIG. 21. The respective directions of dielectric polarization of the right vibrating arm 12c and the left vibrating arm 12b are the same. The respective directions of dielectric polarization of the right vibrating arm 12c and the middle vibrating arm 12a are symmetrical, and the respective directions of dielectric polarization of the left vibrating arm 12b and the middle vibrating arm 12a are symmetrical vertically and horizontally.

Figure 20B:
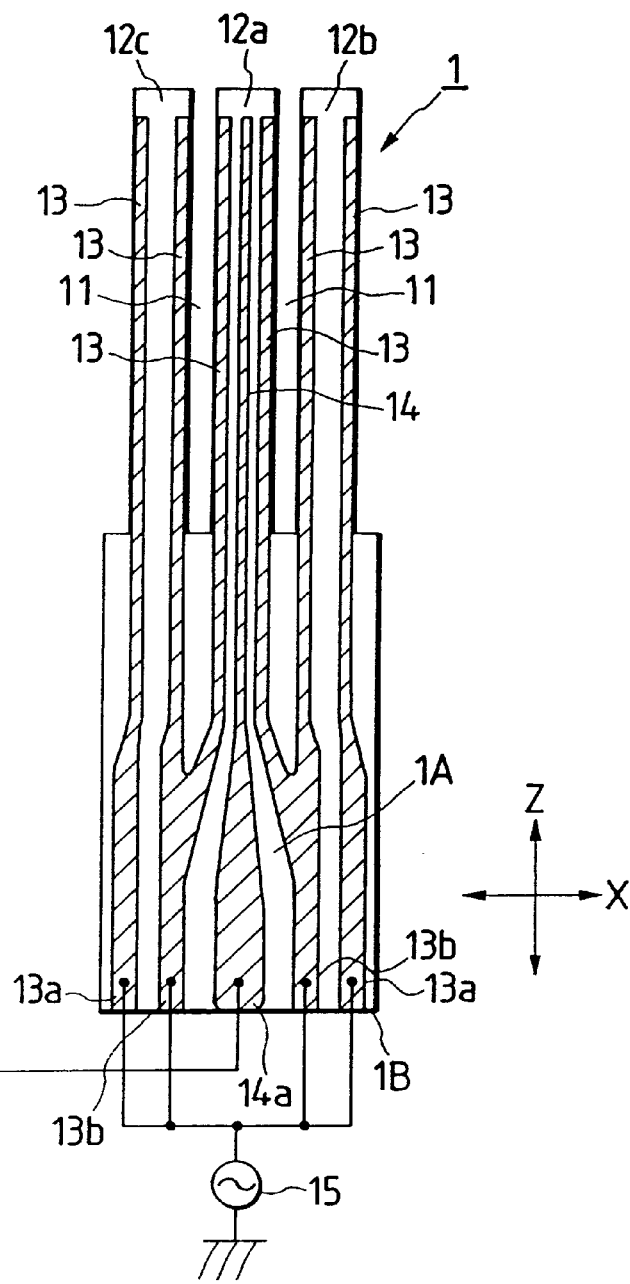
Figure 21:
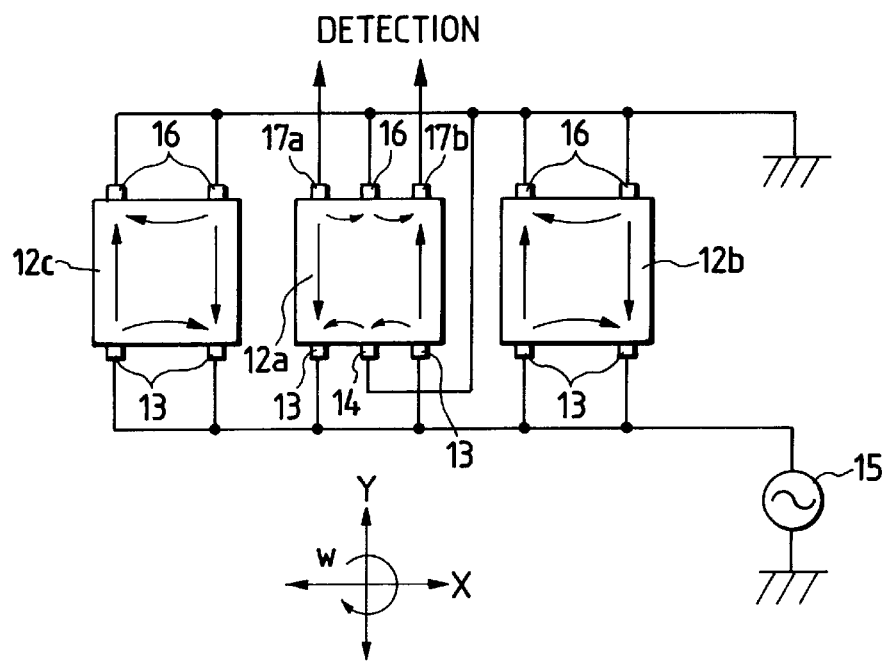
FIG. 21 is a diagrammatic view of assistance in explaining the direction of dielectric polarization of the vibrator.
Figure 22:
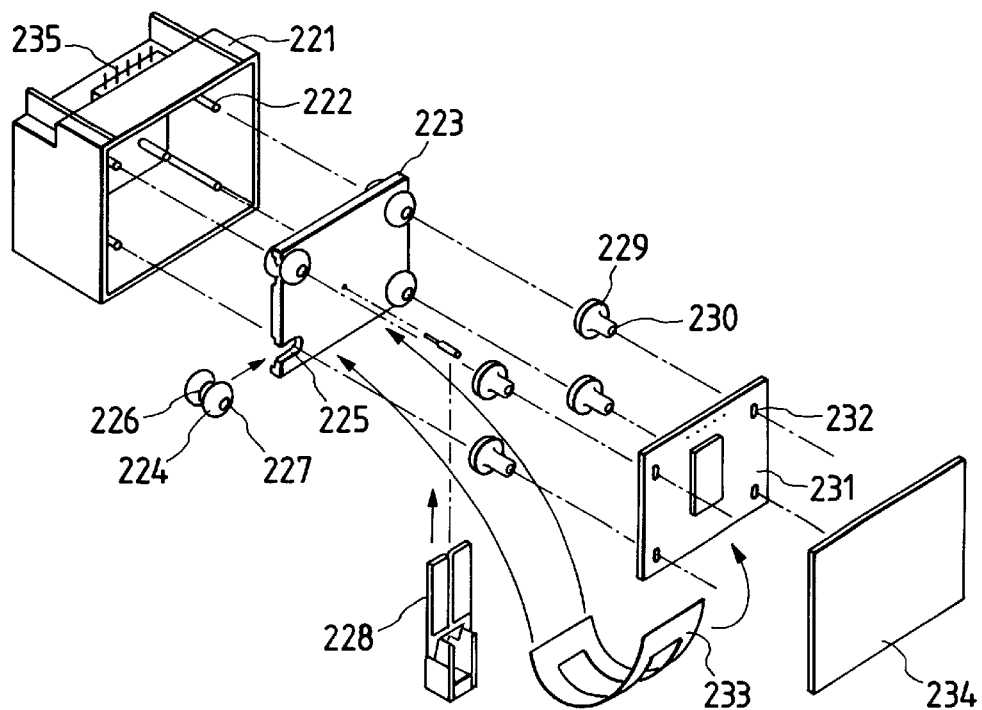
FIG. 22 is an exploded perspective view of a conventional vibrating gyroscope.

As shown in FIG. 20B, a pair of driving electrodes 13 of a conductive material are formed on the back surface of each of the vibrating arms 12a, 12b and 12c, and the driving electrodes 13 are connected to lands 13a and 13b formed on the base part 1A of the vibrator 1 so as to extend to the end surface 1B of the base part 1A of the vibrator 1. Each of the lands 13b is connected to the two driving electrodes 13. An ac power source 15 is connected electrically to the driving electrodes 13 to apply a driving voltage to the driving electrode 13. A grounding electrode 14 is formed on the back surface of the middle vibrating arm 12a and is connected to a land 14a formed on the base part 1A so as to extend to the end surface 1B of the vibrator 1. The grounding electrode 14 is connected electrically through the land 14a to a ground.

A pair of grounding electrodes 16 are formed on the front surface of each of the right vibrating arm 12c and the left vibrating arm 12b, and one grounding electrode 16 is formed on the front surface of the middle vibrating arm 12a. As shown in FIG. 20A, each of the pairs of grounding electrodes 16 are connected to lands 16b formed on the base part 1A of the vibrator 1 so as to extend to the end surface 1B of the base part 1A of the vibrator 1. The grounding electrode 16 formed on the middle vibrating arm 12a is connected to a land 16a formed on the base part 1A so as to extend to the end surface 1B of the vibrator 1. The grounding electrodes 16 are connected electrically to a ground.

A driving voltage is applied through the driving electrodes 13 and the grounding electrodes 14 and 16 to the piezoelectric material as driving means. The right vibrating arm 12c and the left vibrating arm 12b are driven for vibration in directions parallel to the X-axis (hereinafter referred to as "X-axis vibration") in the same phase and the middle vibrating arm 12a is driven for vibration in a phase opposite the phase of vibration of the vibrating arms 12b and 12c, i.e., a phase different from that of the vibration of the vibrating arms 12b and 12c by 180°; that is, the direction of vibratory displacement of the middle vibrating arm 12a along the X-axis is reverse to those of vibratory displacement of the right vibrating arm 12c and the left vibrating arm 12b.

A pair of sensing electrodes 17a and 17b are formed on the front surface of the middle vibrating arm 12a. Parts of the sensing electrodes 17a and 17b formed on the base part 1A of the vibrator 1 are formed in lands 17a1 and 17b1 extending to the end surface 1B. End parts of the lands 17a and 17b are formed in an increased width because the land 16a of the grounding electrode 16 formed on the middle vibrating arm 12a does not extend to the end surface 1B of the base part 1A of the vibrator 1.

The driving electrodes 13 formed on the vibrator 1 are connected electrically by the flexible wiring board 5, not shown in FIG. 20, to a circuit pattern formed on the wiring board 6. The driving electrodes 13 are connected electrically through the circuit pattern of the wiring board 6 to the ac power source 15. The grounding electrodes 14 and 16 and the sensing electrodes 17a and 17b are connected electrically by the flexible wiring board 5 to a predetermined circuit pattern formed on the wiring board 6. The flexible wiring board 5 has one end part bifurcated into a front connecting part 5a welded to the lands formed on the front surface of the vibrator 1 and a back connecting part 5b welded to the lands formed on the back surface of the vibrator 1, and the other end serving as a terminal part 5c.

Since the vibrator 1 is supported at one end part thereof on the vibrator holding case 4 in a cantilever fashion, only a small number of parts are necessary for fixing the vibrator 1. The base part 1A of the vibrator I is securely held by the vibrator holding case 4. Since the base part 1A of the vibrator 1 is held by the vibrator holding case 4, the vibrator 1 is stably held by the vibrator holding case 4. Further, since the vibrator 1 is attached to the wiring board 6 through the rubber vibration isolator 3, external shocks and external vibrations exerted on the wiring board 6 are attenuated by the rubber vibration isolator 3 to prevent shocks and vibrations from being directly transmitted to the vibrator 1.

Since the phase of vibration of the middle vibrating arm 12a of the three-armed tuning fork type vibrator 1 employed in this embodiment, is different by 180° from the phase of vibration of the right vibrating arm 12c and the left vibrating arm 12b of the same, the vibrator 1 is able to vibrate in a well balanced mode, and vibration, if any, of the base part 1A of the vibrator 1 is very small. Thus, the vibrating arms 12a, 12b and 12c are able to vibrate freely with the base part 1A held by the vibrator holding case 4, and hence the vibrating arms 12a, 12b and 12c are able to vibrated in quick response to the driving voltage and able to achieve measurement in high sensitivity.

Coriolis force F (vector quantity) is expressed by:

$$F=2m(v \times \omega_0) \text{ (x indicates vector product)}$$

where m is the mass of the vibrating arm, v is the vibrating velocity (vector quantity) of the vibrating arm in directions parallel to the X-axis, and ($\omega_0$ is the angular velocity of a rotational system about the Z-axis. The Coriolis force F is proportional to the angular velocity $\omega_0$. Accordingly, the angular velocity $\omega_0$ can be determined through the measurement of the vibratory distortion in a direction parallel to the Y-axis (hereinafter referred to as Y-axis vibratory distortions") of the middle vibrating arm 12a.

If the vibrator 1 is placed in a rotational system moving at an angular velocity about the Z-axis, vibrations of the vibrating arms 12a, 12b and 12c include vibrational components in directions parallel to the Y-axis owing to Colioris forces F. Since the phase difference between the vibration of the middle vibrating arm 12a, and that of the vibrating arms 12b and 12c is 180°, the phase difference between the Y-axis vibration of the middle vibrating arm 12a and that of the vibrating arms 12b and 12c caused by Colioris forces F is 180°; that is, at a time point, the middle vibrating arm 12a is distorted in one direction parallel to the Y-axis while the vibrating arms 12b and 12c are distorted in the opposite direction parallel to the Y-axis.

The sensing electrodes 17a and 17b are formed on the front surface of the middle vibrating arm 12a to measure the Colioris force F by the middle vibrating arm 12a made of the piezoelectric material. Since the directions of dielectric polarization in portions of the middle vibrating arm 12a in which the sensing electrodes 17a and 17b are formed are opposite to each other, the phase difference between output signals representing piezoelectric actions that appear on the sensing electrodes 17a and 17b is 180°. The absolute values of the output signals appeared at the sensing electrodes 17a and 17b are added to calculate an angular velocity ω about the Z-axis on the basis of the output signals.

Figure 11:
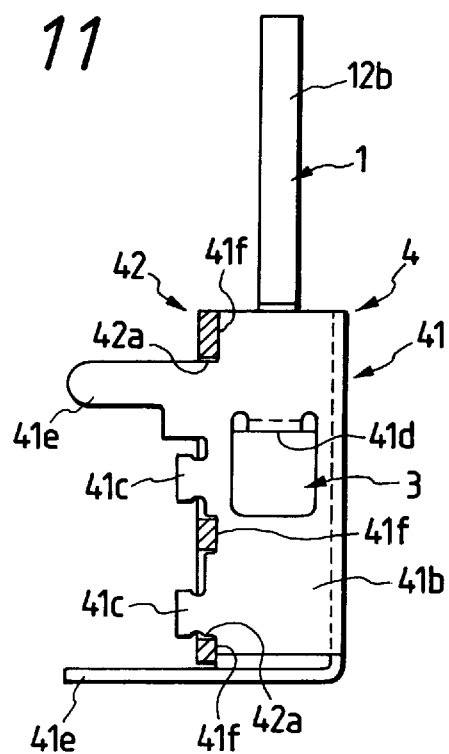
FIG. 11 is a side elevation of an assembly of a vibrator and a vibrator holding case.
Figure 12:
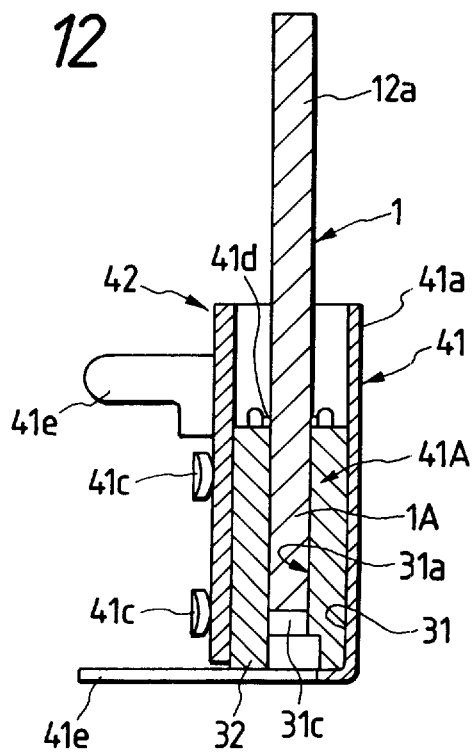
FIG. 12 is a longitudinal sectional view of the assembly shown in FIG. 11.
Figure 13A:
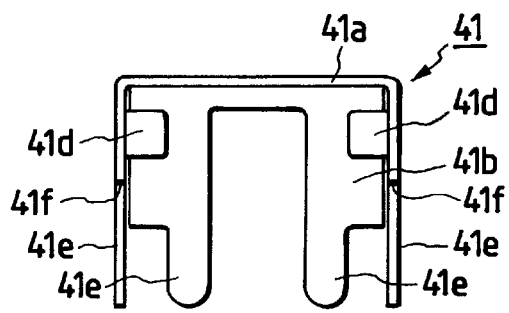
FIGS. 13A, 13B, 13C, 13D and 13E are a plan view, a rear elevation, a bottom view, a right-hand side elevation and a left-hand side elevation, respectively, of a first holding member of the vibrator holding case.
Figure 13D:
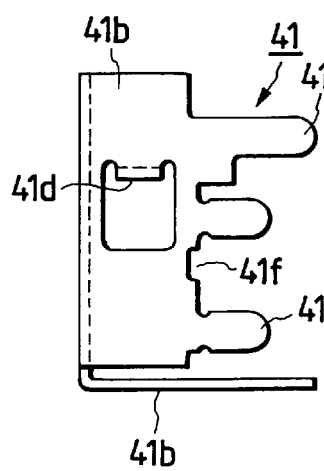
Figure 13B:
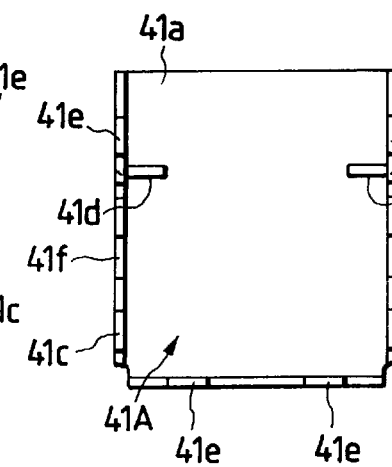
Figure 13E:
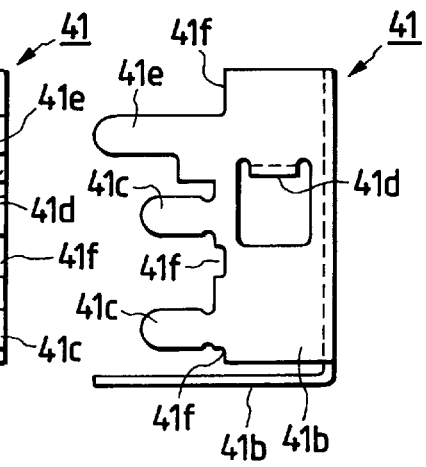
Figure 13C:
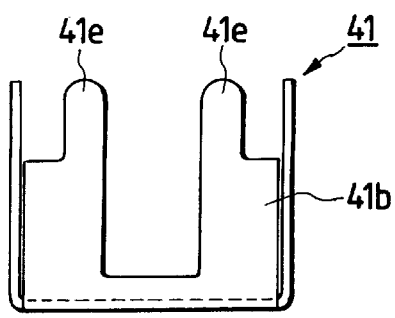
Figure 14A:
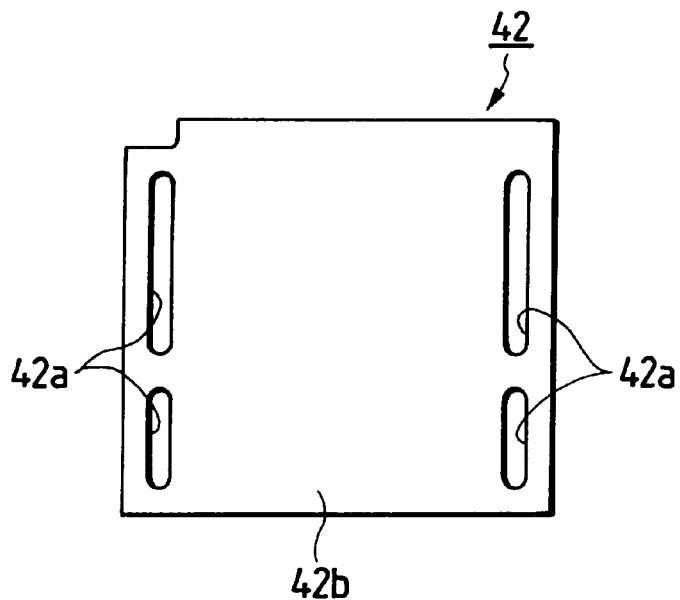
FIG. 14A and 14B are a rear elevation and a side elevation, respectively, of a second holding member of the vibrator holding case.
Figure 14B:
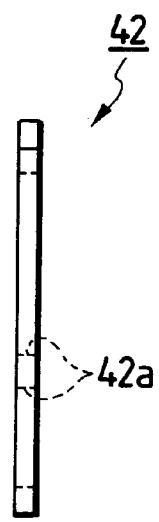

Referring to FIGS. 3 to 5, 11 and 12, the base part 1A of the vibrator 1 is embedded in the rubber vibration isolator 3, and the rubber vibration isolator 3 is held in the vibrator holding case 4. As shown in FIGS. 5, 11 and 12, the vibrator holding case 4 consists of a first holding member 41 having the shape of a case and containing the rubber vibration isolator 3, and a second holding member 42 having the shape of a lid and attached to the first holding member 41. The first holding member 41 is formed by bending a 0.3 mm thick plate of phosphor bronze. The second holding member 42 is formed by shaping a 0.5 mm thick phosphor bronze plate. As shown in FIG. 13, the first holding member 41 has a flat, rectangular bottom wall 41a, and side walls 41b rising from the three sides of the bottom wall 41a. The opposite side walls 41b are provided on their upper edges with fastening lugs 41c, and rubber vibration isolator holding lugs 41d formed by raising portions thereof inward. The side walls 41b are provided on their upper edges with attaching lugs 41e to be engaged with the wiring board 6. The opposite side walls 41b are provided in their upper edges with positioning recesses 41f on the bottoms of which the second holding member 42 is seated to determine the distance between the bottom wall 41a and the second holding member 42. The rubber vibration isolator 3 is fitted in a space 41A defined by the bottom wall 41a, the side walls 41b and the positioning lugs 41d. As shown in FIG. 14, the second holding member 42 is provided with slits 42a at positions corresponding to the fastening lugs 41c and the attaching lugs 41e. The fastening lugs 41c and the attaching lugs 41e are inserted through the slits 42a of the second holding member 42. The second holding member 42 has a flat part 42b for compressing the rubber vibration isolator 3. The thickness of the plate forming the second holding member 42 is greater than that of the plate forming the first holding member 41 because the second holding member 42 is not bent and the second holding member 42 needs to secure a sufficient rigidity by the thickness of the plate forming the same.

The vibrator holding case 4 may be formed of a metal, such as copper, a steel or aluminum, or an engineering plastic. Preferably, the vibrator holding case 4 is made of phosphor bronze in view of dimensional accuracy, mechanical strength and cost. The vibrator holding case is plated with solder. If the vibrator holding case 4 is fastened to the wiring board 6 by crimping, the holding member 4 need not be plated with solder.

Figure 15A:
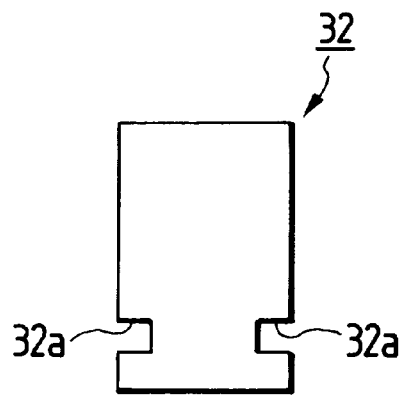
FIGS. 15A and 15B are a front elevation and a side elevation, respectively, of a second vibration isolating member of a rubber vibration isolator.
Figure 15B:
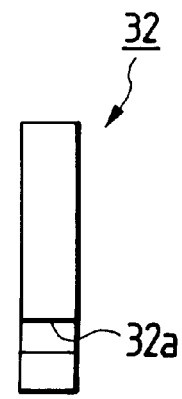
Figure 16A:
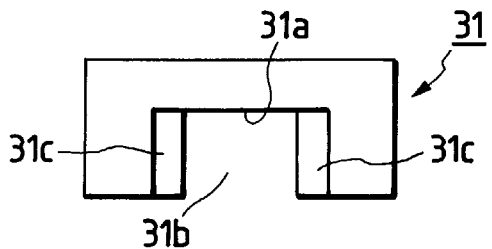
FIGS. 16A, 16B, 16C and 16D are a plan view, a rear elevation, a bottom view and a longitudinal sectional view, respectively, of a first vibration isolating member of the rubber vibration isolator.
Figure 16B:
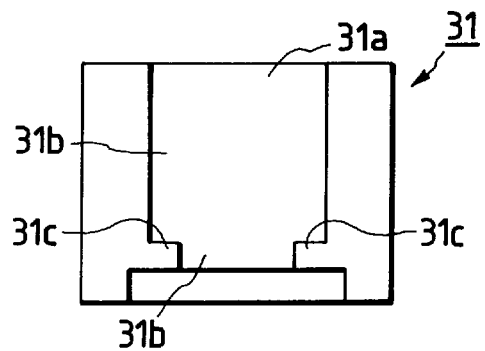
Figure 16D:
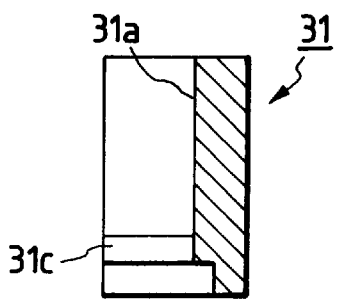
Figure 16C:
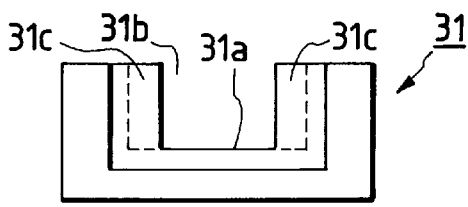

As shown in FIG. 5, the rubber vibration isolator 3 consists of a first vibration isolating member 31 and a second vibration isolating member 32. As shown in FIG. 16, the first vibration isolating member 31 has a hollow 31a for receiving the base part 1A of the vibrator 1, and a pair of walls 31c defining a recess 31b through which the flexible wiring board 5 welded to the base part 1A of the vibrator 1 is extended outside. As shown in FIG. 15, the second vibration isolating member 32 having the shape of a rectangular plate is provided with a pair of recesses 32a to be mated with the pair of walls 31c of the first vibration isolating member 31.

The vibration isolator (elastic member) 3 is made of NBR (acrylonitrile-butadiene rubber), EPDM (ethylene-propylene dimethylene), silicone rubber or urethane rubber. It is preferable to form the rubber vibration isolator 3 of silicone rubber having hardness (elasticity) which does not change greatly with time when the vibrating gyroscope is intended for use in an environment in which temperature varies in a wide range, such as on a vehicle. Preferably, the vibration isolator has a hardness in the range of Hs 10 to 30, more preferably, a hardness on the order of Hs 20. The rubber vibration isolator 3 of silicone rubber having a hardness in the range of Hs 10 to 30 can be formed in a desired shape by molding and exhibits satisfactory vibration isolating performance.

The first vibration isolating member 31 is fitted in the first holding member 41 of the vibrator holding case 4, the assembly formed by soldering the flexible wiring board 5 to the base part 1A of the vibrator 1 is fitted in the hollow 31a of the first vibration isolating member 31, the second vibration isolating member 32 is put on the base part 1A of the vibrator 1 with the pair of walls 31c of the first vibration isolating member 31 fitted in the recesses 32a of the second vibration isolating member 32 to hold the base part 1A between the first vibration isolating member 31 and the second vibration isolating member 32, the second holding member 42 is put on the first holding member 41 with the fastening lugs 41c projected from the slits 42a, and the fastening lugs 41c are bent to fasten the second holding member 42 to the first holding member 41 so that the rubber vibration isolator 3 is compressed at a compression ratio in the range of 10 to 30% in the vibrator holding case 4. Thus, the rubber vibration isolator 3 is pressed against the base part 1A of the vibrator 1 by the vibrator holding case 4.

The attaching lugs 41e of the vibrator holding case 4 are inserted through slots 6b formed in the wiring board 6, and the attaching lugs 41e are soldered to the back surface of the wiring board 6 to attach the vibrator holding case 4 holding the rubber vibration isolator 3 put on the base part 1A of the vibrator 1 to the wiring board 6 as shown in FIG. 4. In this embodiment, the vibrator 1 is set with its end surface 1B facing down and the vibrating arms 12a, 12b and 12c extended vertically upward from the vibrator holding case 4.

Figure 9:
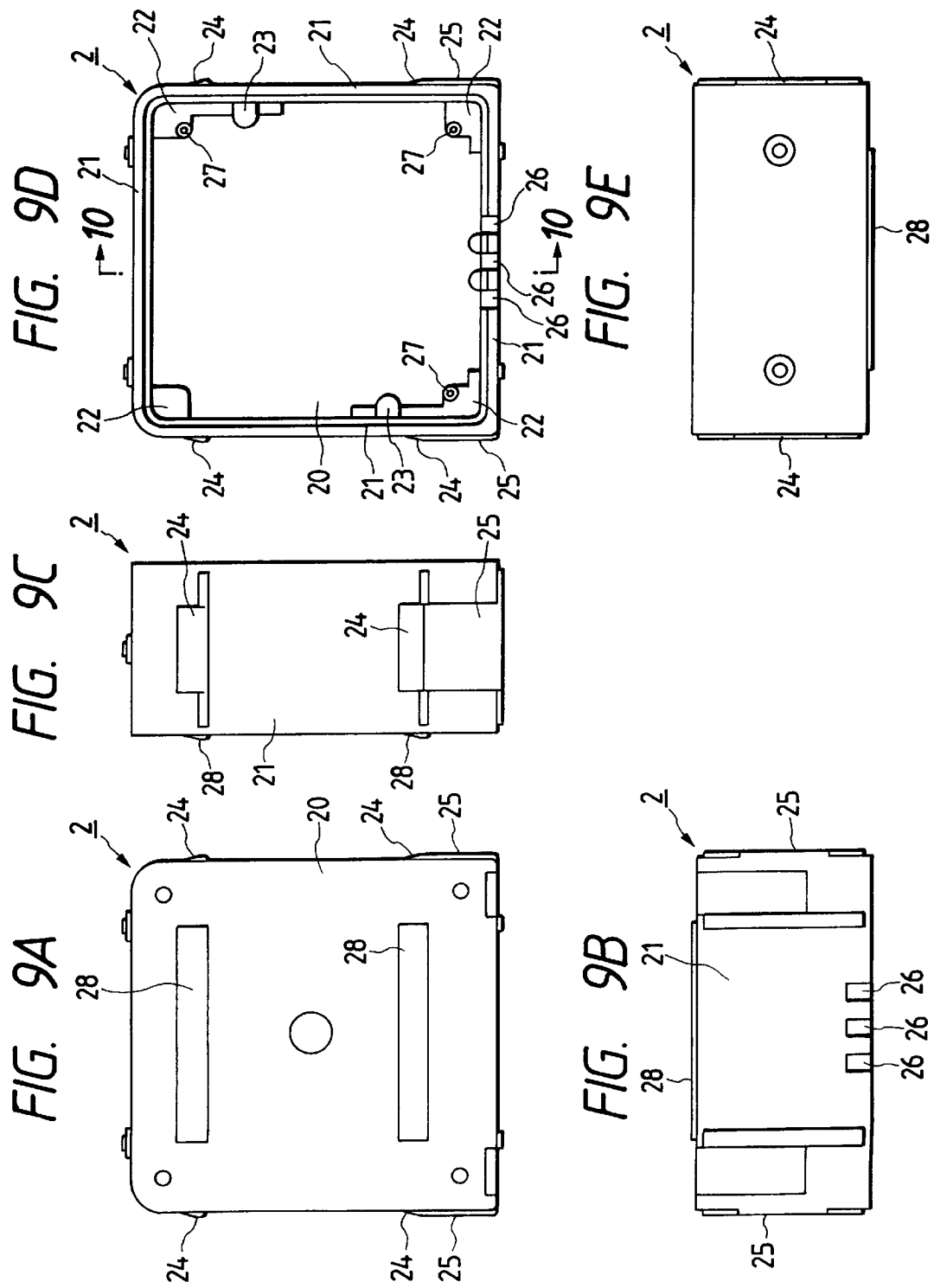
FIGS. 9A, 9B, 9C, 9D and 9E are a front elevation, a bottom view, a right-hand side elevation, a rear elevation and a plan view, respectively, of a case.
Figure 10:
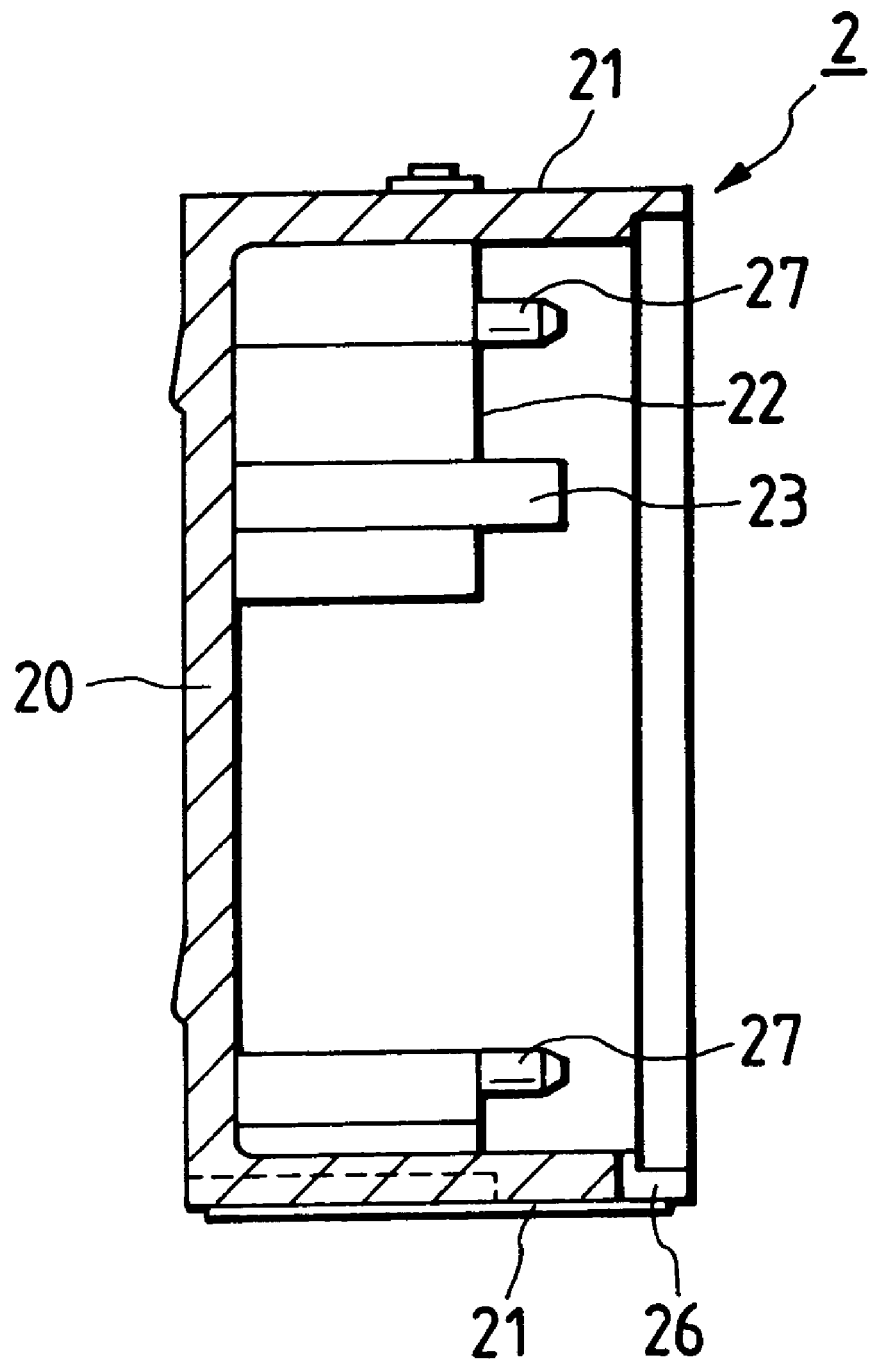
FIG. 10 is a sectional view taken on line 10—10 in FIG. 9D.
Figure 19:
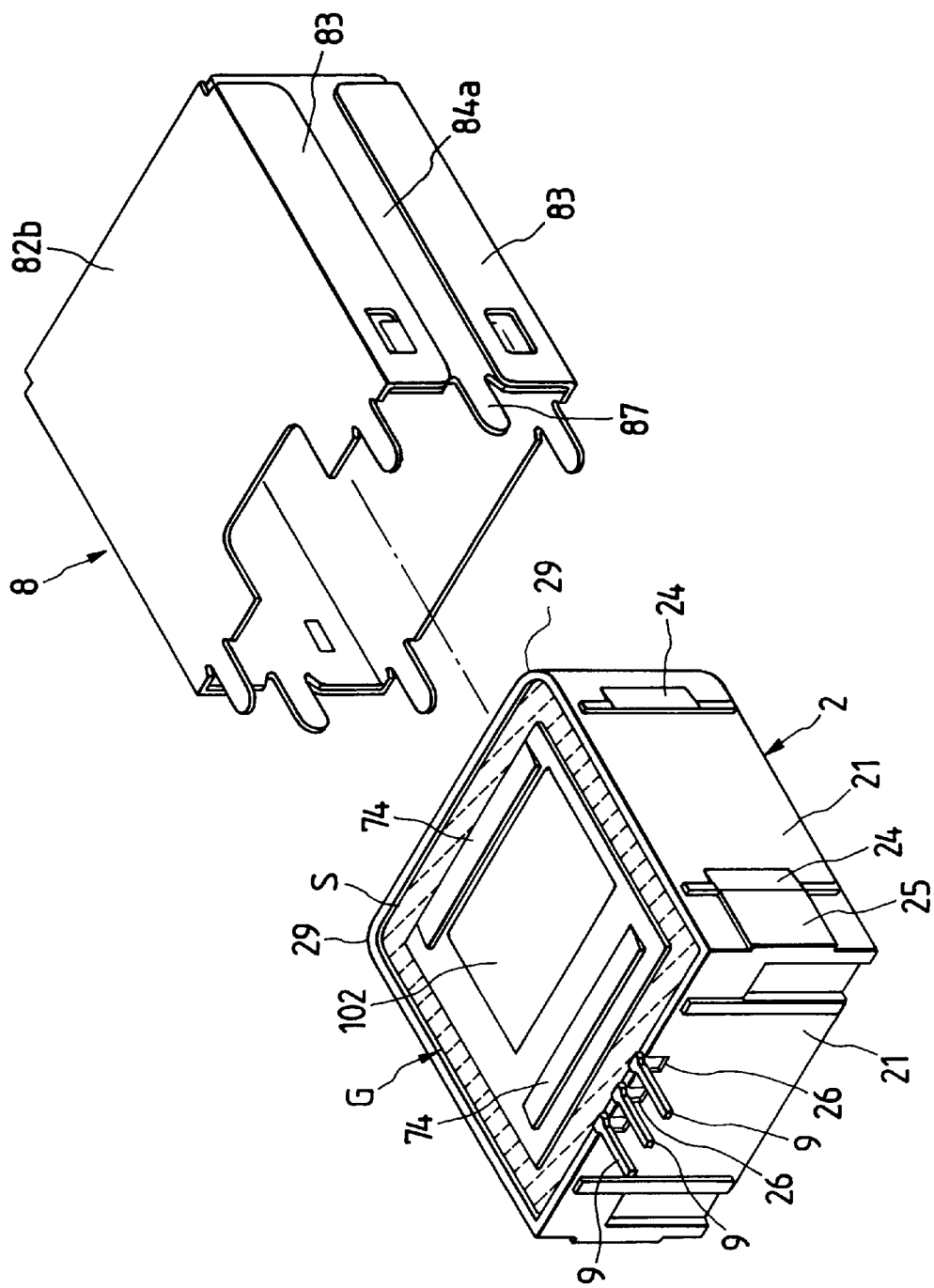
FIG. 19 is an exploded perspective view before a sheet cover is attached.

Referring to FIGS. 9 and 10, the case 2 is formed of a synthetic resin in the shape of a rectangular box having an open end. The case has a rectangular bottom wall 20, side walls 21, support columns 22 for supporting the wiring board 6 thereon, formed integrally with the side walls 21 in the four corners of the case 2, fastening ribs 23 to be fitted in recesses 6a formed in the edges of the wiring board 6 to position the wiring board 6 in the case 2 and each having an end part which projects from the wiring board 6 when the wiring board 6 is placed on the support columns 22 and is crimped by heat to fasten the wiring board 6 to the support column 22, tapered guides 24 formed on the outer surfaces of the opposite side walls 21 to guide the shield cover 8 when putting the shield cover 8 on the case 2, steps 25 formed continuously with the tapered guides 24 which serves as bearing parts for bearing force that may be exerted when bending stopping lugs 87 of the shield cover 8, recesses 26 through which the terminals 9 of the wiring board 6 project outside, positioning pins 27 for positioning the wiring board 6, and tapered guides 28 for guiding the shield cover 8 when putting the shield cover 8 on the case 2. As shown in FIG. 9B, the recesses 26 have flat bottom surfaces 26*a*, respectively. As shown in FIG. 19, edges 29 at the opposite ends of one of the side walls 21 of the case 2 are rounded to facilitate work for putting the shield cover 8 on the case 2.

Material suitable for forming the case 2 and the lid 7 are engineering plastics, i.e., synthetic resins, such as PBT (polybutylene terephthalate), PPS (polyphenylene sulfide), ABS (acrylonitrile-butadiene-styrene resin) and the like. PBT is preferable in view of heat resistance and strength. The case 2 may have an open lower end, and the open lower end may be covered with a bottom lid.

The wiring board 6 is provided with a detection circuit and the like. As shown in FIGS. 4 and 5, the wiring board 6 is provided with the recess 6*a* in which the fastening ribs 23 are fitted, the slots 6*b* through which the attaching lugs 41*e* are inserted, positioning holes 6*c* in which the positioning pins 27 are fitted, and the terminals connected to the detection circuits and the like. A preset variable resistor 61 is mounted on the wiring board 6. The terminals 9 will be described later.

Figure 6:
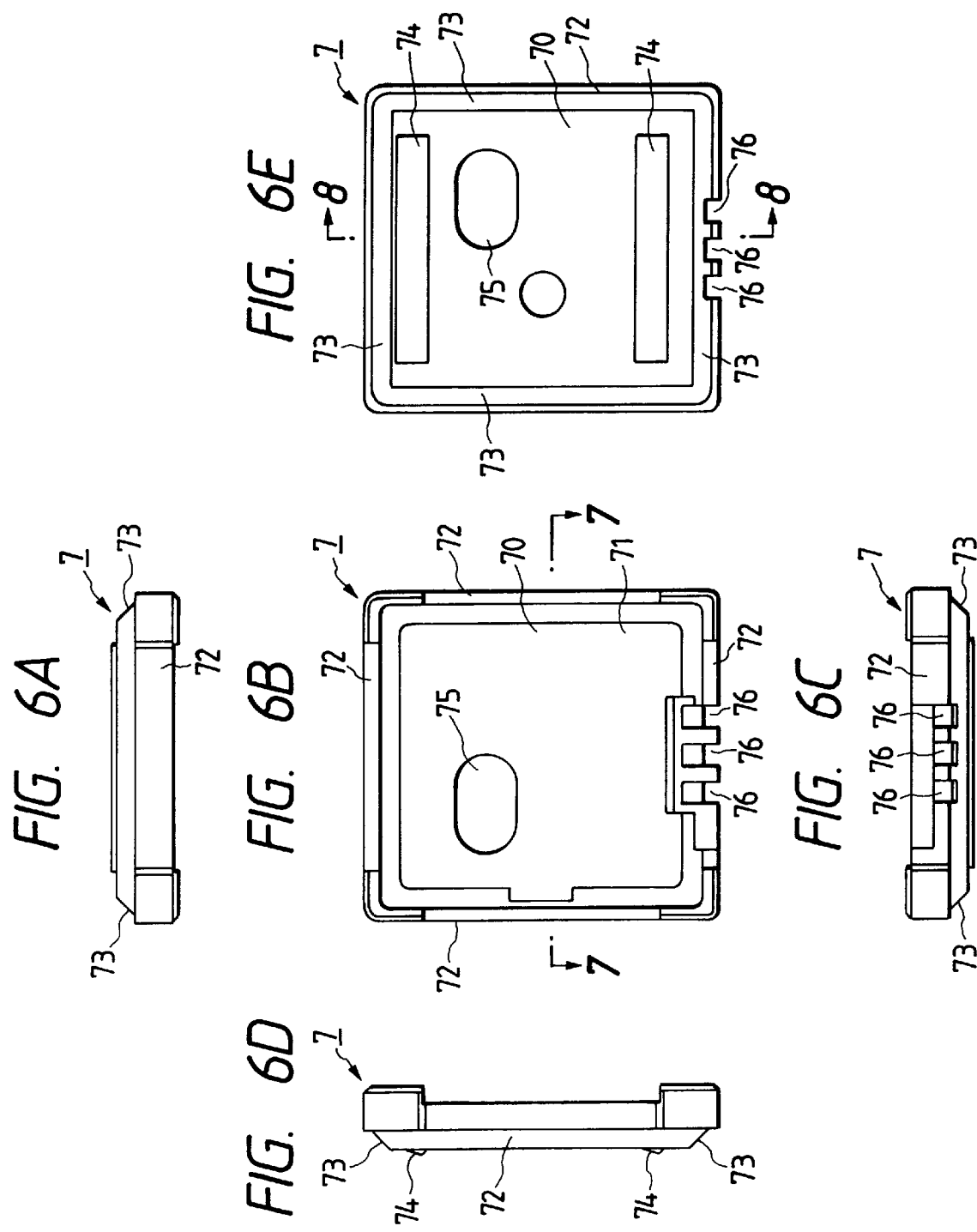
FIGS. 6A, 6B, 6C, 6D and 6E are a plan view, a front elevation, a bottom view, a left-hand side elevation and a rear view, respectively, of a lid.
Figure 7:
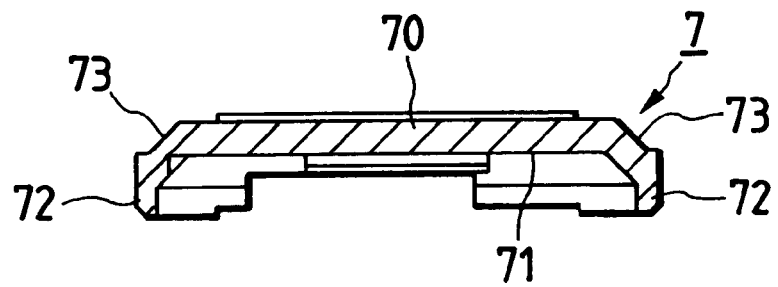
FIG. 7 is a sectional view taken on line 7—7 in FIG. 6B.
Figure 8:
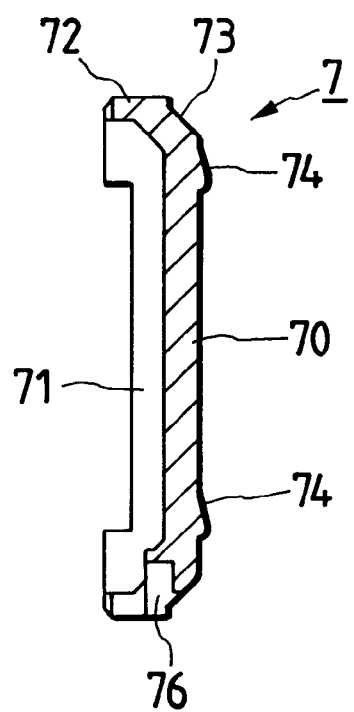
FIG. 8 is a sectional view taken on line 8—8 in FIG. 6E.

The lid 7 of a generally rectangular shape is fitted in a space defined by upper end parts of the side walls 21 of the case 2 to cover the open end of the case 2. As shown in FIGS. 6 to 8, the lid 7 has a flat part 70 having inner surface provided with a recess 71 surrounded by ribs 72, bevels 73 formed in the periphery of the outer surface of the flat part 70, tapered guides 74 formed on the outer surface of the flat part 70 to guide the shield cover 8 when putting the shield cover 8 on the case 2, a vent hole 75 for the discharge of pressure from the case when bonding together the case 2 and the lid 7 by heat, and recesses 76 formed in one of the side walls 72 to allow the terminals 9 to project outside.

The lid 7 has a shape generally resembling an inverted dish. When the lid 7 is put on the case so as to cover the open end of the case 2, a groove G is formed along the fringe of the lid 7 (the joint of the lid 7 and the case) by the bevels 73 of the lid 7 and end parts of the inner surfaces of the side walls 21 as shown in FIGS. 3 and 19. The groove G is filled with an adhesive S as indicated by a shaded region in FIG. 19 to bond the lid 7 to the case 2 along the fringe of the lid 7. Four corner parts formed at the joints of the side walls 72 rest on the wiring board 6 and hence the lid 7 does not sink in the case 2.

The shield cover 8 is formed by bending a workpiece formed by punching a 0.3 mm thick metal plate. The metal plate may be a copper, steel or aluminum plate. In this embodiment, the shield cover 8 is formed by processing a tinned steel plate in view of cost, strength and facility of soldering. As shown in FIGS. 2 and 5, the shield cover 8 has a rectangular top wall 81, a second side wall 82*a* extending from one of the long sides of the top wall 81 at an obtuse angle to the top wall 81, a fourth side wall 82*b* extending from the other long side of the top wall 81 at an obtuse angle to the top wall 81, two pairs of auxiliary side wall 83 formed by bending opposite side parts of the second side wall 82*a* and the fourth side wall 82*b*, a first side wall 84*a* extending from one of the short sides of the top wall 81 at an obtuse angle to the top wall 81, and a third side wall 84*b* extending from the other short side of the top wall 81 at an obtuse angle to the top wall 81. The auxiliary side walls 83 are provided with holes 85 in portions thereof near their free ends. Retaining lugs 86 are formed by raising parts of the first side wall 84*b* and the third side wall 84*b* corresponding to the holes 85. The retaining lugs 86 snap into the holes 85 when the top wall 81, the side walls 82*a*, 82*b*, 84*a* and 84*b* are put together. The first side wall 84*a* and the third side wall 84*b* are provided on their end edges with fastening lugs 84 for fastening the shield cover 8 to the case 2. The second side wall 82*a* and the fourth side wall 82*b* are provided on their end edges with attaching lugs 88 for attaching the shield cover 8 to the printed wiring board 101 of the navigation system.

When completing the shield cover 8 in the shape of a rectangular solid as shown in FIG. 5 by putting the top wall 81, and the side walls 82*a*, 82*b*, 84*a* and 84*b* together, the second side wall 82*a* and the fourth side wall 82*b* extending at an obtuse angle to the top wall 81 are bent elastically toward each other so that the retaining lugs 86 snap into the corresponding holes 85.

As shown in FIGS. 4 and 5, the terminals 9 have the shape of a strip and are thrust in the wiring board 6 perpendicularly to the surface of the wiring board 6. Each of the terminals 9 has a first vertical part 91, a first horizontal part 92 extending perpendicularly to the first vertical part 91, and a second vertical part 93 extending perpendicularly to the first horizontal part 92. Thus, the terminals 9 has a stepped shape having two steps.

When the wiring board 6 is contained in the case 2, the inner surfaces of the first vertical parts 91 of the terminals 9 rest closely on the bottom surfaces 26*a* of the recesses 26 of the case 2 (FIG. 10), and the lower surfaces of the first horizontal parts 92 of the terminals 9 extend along the inner surface of the lower side wall 21 of the case 2 as shown in FIG. 3A. The width of the terminals 9 is equal to or slightly smaller than the recesses 26 of the case 2 and the recesses 76 of the lid 7.

Since the recesses 26 of the case 2 and the recesses 76 of the lid 7 are plugged up with the first vertical parts 91 of the terminals 9, the adhesive S filling the groove G is unable to leak into the case 2. The first horizontal parts 92 of the terminals 9 prevents the adhesive S filling the groove G from flowing onto the side surface of the case 2.

Since the terminals 9 extending through the recesses 26 of the case 2 and the recesses 76 of the lid 7 are bent in the stepped shape of two steps so as to conform to the surfaces forming the groove G, the groove G can uniformly be filled up with the adhesive S and thereby the lid 7 is firmly fastened to the case 2.

A method of putting together the case 2 and the lid 7 will be explained below. The wiring board 6 is put in the case 2, the wiring board 6 is positioned by the positioning pins 27, the end portions of the fastening ribs 23 are crimped by heat to fasten the wiring board 6 to the case 2. Subsequently, the lid 7 is put in the open end of the case 2, the thermosetting adhesive S such as an epoxy resin, is applied to the groove G formed along the joint of the case 2 and the lid 7 by a dispenser or the like so that the recesses 26 and 76 through which the terminals 9 are projecting are covered with the adhesive S. Then, the adhesive S is heated for setting. The vent hole 75 permits air to be discharged from the case 2 when the assembly of the case 2, the wiring board 6 and the lid 7 is heated to set the adhesive S to prevent the case 2 and the lid 7 from being broken by pressure. After the adhesive S has been thus set, the vent hole 75 is covered with a sealing member 102 as shown in FIG. 19.

The adhesive S is an insulating adhesive, such as an epoxy resin or a silicone resin. In view of heat resistance and adhesive strength, a thermosetting epoxy resin is preferable. The adhesive S may be an ultraviolet curable adhesive. It is desirable that the adhesive S has a relatively large viscosity on the order of 500 P at 20° C., because the adhesive S having such a viscosity is resistant to flowing.

As shown in FIGS. 3A, 3B and 19, when putting the shield cover on the assembly of the case 2 and the lid 7, the shield cover 8 is guided by the rounded edges 29 of the case 2, the tapered guides 24 and 28 of the case, and the tapered guides 74 of the lid 7 so that the edges of the shield cover 8 may not be caught by projections formed on the case 2 and the lid 7. After thus putting the shield cover 8 on the assembly of the case 2 and the lid 7, the inner surfaces of the side walls of the shield cover 8 are in contact with only the tapered guides 24, 28 and 74, and the steps 25. The first side wall 84a, the third side wall 84b, the second side wall 82a, the fourth side wall 82b and the auxiliary side walls 83 are pressed outward by the tapered guides 24, 28 and 74, and the steps 25. As shown in FIG. 3B, the stopping lugs 87 are bent along the edges of the steps 25 to hold the case 2 and the lid 7 in the shield cover 8. Thus, the vibrating gyroscope 100 shown in FIGS. 2A to 2E is completed.

The attaching lugs 88 of the shield cover 8 of the vibrating gyroscope 100 is inserted in slots formed in the printed wiring board 101, and the attaching lugs 88 are crimped as shown in FIG. 1 or soldered to the printed wiring board 101 to connect the shield cover 8 electrically to a grounding pattern, not shown, formed on the printed wiring board 101. The grounding pattern (such as a solid pattern or a meshed pattern but solid pattern is more preferable), is formed at a position on the printed wiring board 101 corresponding to the open end of the shield cover 8 to shield the electronic circuits formed on the wiring board 6 contained in the case 2 in cooperation with the shield cover 8.

A support structure for supporting the vibrator 1 will be described hereinafter. The first vibration isolating member 31 is fitted in the space 41A of the first holding member 41. The first vibration isolating member 31 of the rubber vibration isolator 3 is positioned and held in place by the positioning lugs 41d. The base part 1A of the vibrator 1 is fitted in the hollow 31a of the first vibration isolating member 31. Although not shown in FIG. 11, the connecting parts 5a and 5b of the flexible wiring board 5 of a mass equal to 10% or below of the mass of the vibrator 1 are soldered to the front and the back surface, respectively, of the base part 1A of the vibrator 1. The end surface 1B of the base part 1A of the vibrator 1 is in contact with the pair of walls 31c. The second vibration isolating member 32 is put on the base part 1A of the vibrator 1 with the pair of walls 31c of the first vibration isolating member 31 fitted in the recesses 32a of the second vibration isolating member 32 to hold the base part 1A between the first vibration isolating member 31 and the second vibration isolating member 32, the flat second holding member 42 is put on the first holding member 41 with the fastening lugs 41c formed on the opposite side walls 41b of the first holding member 41 projected from the slits 42a, the first vibration isolating member 31 and the second vibration isolating member 32 are so compressed as to bring the inner surface of the flat part 42b of the second holding member 42 into contact with the bottom surfaces of the positioning recesses 41f. Then, as shown in FIGS. 11 and 12, the fastening lugs 41c are crimped to fasten the second holding member 42 to the first holding member 41. The bottom surfaces of the positioning recesses 41f determine the compressive strain (compression ratio) of the rubber vibration isolator 3 and hence the rubber vibration isolator 3 can be compressed by a desired compressive strain by a predetermined compressive force and the vibrator 1 is able to exhibit desired characteristics. Thus, the first vibration isolating member 31, the vibrator 1, the second vibration isolating member 32 and the second holding member 42 can be put in that order in the first holding member 41.

Thus, the base part 1A of the vibrator 1 is held between the first vibration isolating member 31 and the second vibration isolating member 32 of the rubber vibration isolator 3, and the rubber vibration isolator 3 is held between the first holding member 41 and the second holding member 42 to hold the vibrator 1 in a cantilever fashion.

As shown in FIG. 4B, the attaching lugs 41e are not bent and are soldered to the wiring board 6. The vibrator holding case 4 may be attached to the wiring board 6 simply by crimping the attaching lugs 41e, or by crimping and soldering the attaching lugs 41e to the wiring board 6. In FIG. 4, solder is omitted.

Figure 18A:
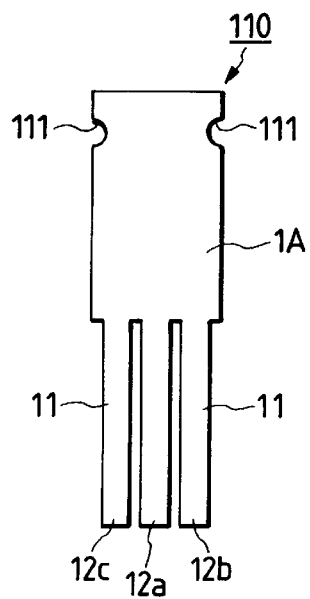
FIGS. 18A, 18B and 18C are front elevations of vibrators in modifications.
Figure 18B:
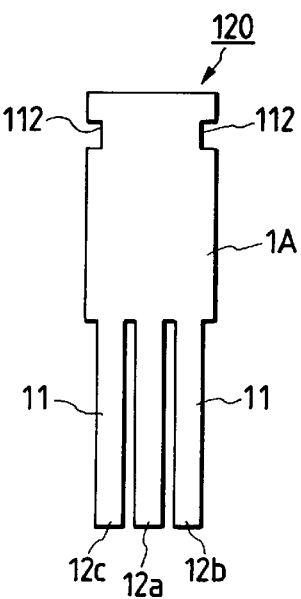
Figure 18C:
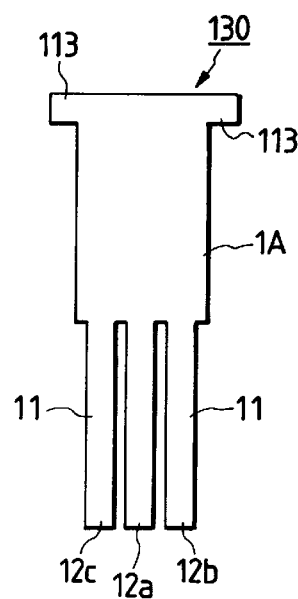

Vibrators 110, 120 and 130 in modifications of the vibrator 1 will be described with reference to FIGS. 18A, 18B and 18C. The vibrators 110, 120 and 130 have base parts 1A provided with circular recesses 111, rectangular recesses 112 and projections 113 in their side surfaces, respectively. Rubber vibration isolators to be used in combination with the vibrators 110, 120 and 130 are provided with projections complementary to the recess 111, projections complementary to the recesses 112 and recesses complementary to the projections 113, respectively, to hold the vibrators 110, 120 and 130 more firmly.

Figure 17:
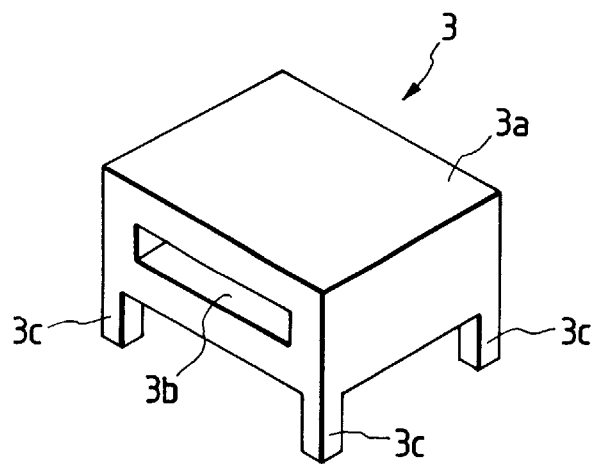
FIG. 17 is a perspective view of a rubber vibration isolator in a modification.

Referring to FIG. 17, a rubber vibration isolator 3 in a modification of the foregoing rubber vibration isolator 3 has a body 3a provided with a slot 3b formed in one side surface thereof to receive the base part 1A of the vibrator 1 therein, and legs 3c formed at the four corners of the lower surface of the body 3a. When the rubber vibration isolator 3 shown in FIG. 17 is employed, the vibrator holding case 4 is omitted and the legs 3c are inserted in holes formed in the wiring board 6 and crimped by heat or are forced into holes formed in the wiring board 6 to attach the rubber vibration isolator 3 holding the vibrator 1 to the wiring board 6.

The foregoing embodiment has the vibrator 1 (110, 120, 130) having the cantilever vibrating arms 12a, 12b and 12c, the rubber vibration isolator 3 holding the base part 1A of the vibrator 12 (110, 120, 130) between the first and the second vibration isolating member, and the wiring board holding the rubber vibration isolator 3. Therefore, only the mass of the member held by the rubber vibration isolator 3, i.e., the mass of the vibrator 1 (110, 120, 130), is subject to the effect of inertial force. Since this mass is small, the effect of inertial force on the vibrator 1 (110, 120, 130) is not significant and hence the frequency response of the vibrator 1 (110, 120, 130) is satisfactory. Although the flexible wiring board 5 is connected to the vibrator 1 (110, 120, 130), the mass of the flexible wiring board 5 is negligible because the same is very small as compared with the mass of the vibrator 1 (110, 120, 130).

The rubber vibration isolator 3 has the first vibration isolating member 31 and the second vibration isolating member 32, the base part 1A of the vibration isolator 1 is held between the first vibration isolating member 31 and the second vibration isolating member 32, the rubber vibration isolator 3 thus holding the vibrator 1 is put in and compressed by the vibrator holding case 4, and the vibrator holding case 4 is attached to the wiring board 6. Since the lead wires and the wiring lines of the flexible wiring board 5 connected to the electrodes formed on the base part 1A of the vibrator 1 are thus covered with the rubber vibration isolator 3, the possibility that the joints of the electrodes, and the lead wires and such are damaged when assembling the vibrating gyroscope is reduced. If the rubber vibration isolator 3 is provided with a hole and the base part 1A of the vibrator 1 is pressed into the hole it is possible that the joints of the electrodes, and the lead wires and such interfere with the rim of the hole, and the electrodes, and the lead wires and such may possibly disconnected.

The rubber vibration isolator 3 consists of the first vibration isolating member 31 provided with the hollow 31a, and the second vibration isolating member 32 put on the base part 1A of the vibrator 1 fitted in the hollow 31a of the first vibration isolating member 31 to hold the base part 1A between the first vibration isolating member 31 and the second vibration isolating member 32. Therefore, the first vibration isolating member 31, the vibrator 1 and the second vibration isolating member 32 are superposed in that order, which facilitates work for assembling the rubber vibration isolator 3 and the vibrator The base part 1A of the vibrator 1 has the shape of a plate, the vibrator holding case 4 compresses the rubber vibration isolator 3 in the direction of thickness, i.e., substantially perpendicularly to the surfaces of the base part 1A of the vibrator 1. Therefore, the rubber vibration isolator 3 is hardly twisted, the vibrator 1 is hardly tilted, and the change of the characteristics of the vibrator 1 due to the tilt of the vibrator 1 can be prevented. It the rubber vibration isolator 3 is compressed in directions other than the directions perpendicular to the surfaces of the base part 1A of the vibrator 1, the rubber vibration isolator 3 may be twisted causing the vibrator 1 to tilt irregularly, whereby the intrinsic characteristics of the vibrator 1 are changed greatly.

The vibrator holding case 4 consists of the first holding member 41 (case) of a metal having at least the flat bottom wall 41a and opposite side walls 41b continuous with the bottom wall 41a, and the second holding member 42 (lid) having the flat part 42b pressing the rubber vibration isolator 3 against the bottom wall 41a of the first holding member 41. The side walls 41b of the first holding member 41 are provided with the fastening lugs 41c, respectively, the rubber vibration isolator 3 holding the base part 1A of the vibrator 1 is placed between the side walls of the first holding member 41 with the surfaces of the base part 1A extended substantially in parallel to the bottom wall 41a, the second holding member 42 is superposed on the rubber vibration isolator 3 with the flat part 42b thereof in contact with the rubber vibration isolator 3, and the fastening lugs 41c are crimped so as to hold the second holding member 42 in place. Since the rubber vibration isolator 3 is compressed between the flat bottom wall 41a of the first holding member 41 and the flat part 42b of the second holding member 42, the rubber vibration isolator 3 can easily be compressed in directions substantially perpendicularly to the surfaces of the base part 1A of the vibrator 1 to prevent the base part 1A of the vibrator 1 from warping and tilting with improved reliability. The first vibration isolating member 31, the vibrator 1, the second vibration isolating member 32 and the second holding member 42 can be superposed in that order in the first holding member 41, and the second holding member 42 can be held in place simply by crimping the fastening lugs 41c. Thus, the vibrator 1, the rubber vibration isolator 3 and the vibrator holding case 4 can easily be assembled.

The first holding member 41 is provided with the positioning recesses 41f for determining the distance between the flat bottom wall 41a and the flat part 42b of the second holding member 42. Therefore, the flat bottom wall 41a of the first holding member 41 and the flat part 42b of the second holding member 42 can accurately be spaced a predetermined distance, whereby the rubber vibration isolator 3 is compressed accurately by a desired compressive strain by a predetermined pressure. Consequently, the vibrator 1 is able to exhibit its intrinsic characteristics.

The side walls 41b of the first holding member 41 is provided with the attaching lugs 41e, and the attaching lugs 41e are fastened to the wiring board 6 to attach the vibrator holding case 4 holding the rubber vibration isolator 3 to the wiring board 6. Thus, the rubber vibration isolator 3 can easily and securely be held on the wiring board 6.

The vibrator holding case 4 is provided with the positioning lugs 41d for positioning and retaining the rubber vibration isolator 3 in the vibrator holding case 4. Therefore, the rubber vibration isolator 3 will not fall off the vibrator holding case 4 even if vibrations are exerted on the rubber vibration isolator 3.

Since the rubber vibration isolator 3 is made of silicone rubber, the rubber vibration isolator 3 is able to exercise its vibration isolating function at temperatures in a wide temperature range, and the vibrating gyroscope is lightweight and inexpensive.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A vibrating gyroscope comprising:
   a vibrator having a base part and provided with cantilever vibrating arms having vibrating free end parts;
   an elastic vibration isolator put on the base part of the vibrator;
   a wiring board supporting the elastic vibration isolator; and
   a vibrator holding case consisting of a first holding member and a second holding member,
   wherein the elastic vibration isolator has a plurality of vibration isolating members to be pressed against the opposite surfaces of the base part of the vibrator, respectively to hold the base part of the vibrator therebetween,
   the elastic vibration isolator is interposed and compressed between the first and the second holding members of the vibrator holding case, and
   the vibrator holding case is attached to the wiring board.

2. The vibrating gyroscope according to claim 1, wherein the elastic vibration isolator has a first elastic member having a hollow, and a second elastic member pressed against the base part of the vibrator fitted in the hollow of the first elastic member, and
   the base part of the vibrator is fitted in the hollow of the first elastic member and is held between the first and the second elastic member.

3. The vibrating gyroscope according to claim 2, wherein the base part of the vibrator has the shape of a plate, and the first and second elastic members of the elastic vibration isolator are pressed against opposite flat surfaces of the plate-shaped base part of the vibrator substantially perpendicularly to the surfaces of the base part by the vibrator holding case.

4. The vibrating gyroscope according to claim 3, wherein the vibrator holding case has a first holding member of a metal having at least a flat bottom wall and opposite side walls continuous with the flat bottom wall, and a plate-shaped second holding member, the first and the second holding member are pressed against the elastic members of the elastic vibration isolator, respectively, at least one of the side walls of the first holding member is provided with a fastening lug, the first and the second elastic members of the elastic vibration isolator and the base part of the vibrator are disposed between the side walls of the first holding member so that the surfaces of the base part and the flat surface are substantially parallel to each other, and the fastening lug is fixed by crimping to the second holding member disposed with its plate-shaped part facing toward the flat bottom wall of the first holding member.

5. The vibrating gyroscope according to claim 4, wherein the first holding member is provided with positioning parts for determining the distance between the flat bottom wall of the first holding member and the plate-shaped part of the second holding member.

6. The vibrating gyroscope according to claim 4, wherein the side walls of the first holding member are provided with attaching lugs, respectively, and the vibrator holding case is attached to the wiring board by means of the attaching lugs.

7. The vibrating gyroscope according to claim 4, wherein the vibrator holding case is provided with retaining parts for retaining the elastic members therein.

8. The vibrating gyroscope according to claim 2, wherein the first and second elastic members of the elastic vibration isolator are made of silicone rubber.

* * * * *